United States Patent [19]

Winter et al.

[11] Patent Number: 6,110,267
[45] Date of Patent: Aug. 29, 2000

[54] PIGMENT COMBINATIONS FOR INKS FOR THE INTAGLIO PRINTING OF ILLUSTRATIONS, HAVING IMPROVED RHEOLOGICAL PROPERTIES

[75] Inventors: Rainer Winter, Oberursel; Ibrahim Zidan, Liederbach; Ulrich Ott, Hofheim; Alexander Sieber, Frankfurt, all of Germany

[73] Assignee: Clariant GmbH, Frankfurt, Germany

[21] Appl. No.: 09/039,538

[22] Filed: Mar. 16, 1998

[30] Foreign Application Priority Data

Mar. 17, 1997 [DE] Germany ............................ 197 10 977

[51] Int. Cl.⁷ .................................................. C09D 11/02
[52] U.S. Cl. ..................................... 106/31.77; 106/31.78; 106/31.79; 106/31.8; 106/31.81; 106/494
[58] Field of Search ............................ 106/31.77, 31.79, 106/31.8, 31.81, 31.78, 494

[56] References Cited

U.S. PATENT DOCUMENTS

| | | | |
|---|---|---|---|
| 4,201,710 | 5/1980 | Kurtz et al. ........................... | 106/31.77 |
| 4,316,023 | 2/1982 | Henning et al. ...................... | 106/31.77 |
| 4,352,932 | 10/1982 | Lotsch et al. ........................ | 106/31.77 |
| 4,462,833 | 7/1984 | Hays et al. ........................... | 106/31.75 |
| 4,492,796 | 1/1985 | Lorenz .................................. | 548/471 |
| 5,482,548 | 1/1996 | Stirling et al. .......................... | 106/496 |

FOREIGN PATENT DOCUMENTS

| | | |
|---|---|---|
| 0057880 | 8/1982 | European Pat. Off. . |
| 0651029 | 5/1995 | European Pat. Off. . |
| 3022839 | 1/1982 | Germany . |

*Primary Examiner*—Helene Klemanski
*Attorney, Agent, or Firm*—Susan S. Jackson

[57] ABSTRACT

An intaglio ink for printing illustrations comprises C.I. Pigment Yellow 139 and further, preferably chlorine-free organic yellow pigments and has good rheological and coloristic properties which are comparable with those of conventional intaglio printing inks based on C.I. Pigment Yellow 12.

12 Claims, No Drawings

PIGMENT COMBINATIONS FOR INKS FOR THE INTAGLIO PRINTING OF ILLUSTRATIONS, HAVING IMPROVED RHEOLOGICAL PROPERTIES

The present invention relates to the use of yellow pigment combinations for intaglio inks for the printing of illustrations.

Intaglio printing is divided into illustration and packaging intaglio printing. Illustration intaglio printing is employed preferably for magazines, illustrated journals, store catalogs, etc. Partly because of the differing structure of the printing inks, the two printing techniques dictate differences in what is required of the pigments employed.

Intaglio inks for printing illustrations consist of the colorant, generally an organic pigment, the varnish, which is mostly a natural or synthetic resin and is dissolved in an organic solvent, usually toluene or else mixtures of toluene and other liquid hydrocarbons. Following the application of the printing ink to the paper the solvent evaporates and the pigment is fixed by the resin component of the varnish.

Because of the usually high printing speeds in the intaglio printing of illustrations, the printing inks must be highly mobile. The yellow pigments used principally at present for illustration intaglio printing inks are amine-formulated diaryl yellow pigments, especially C.I. Pigment Yellow 12 (C.I. No. 21 090), as described, for example, in U.S. Pat. No. 4,462,833 or in EP-A-0 057 880. C.I. Pigment Yellow 12 includes a dichlorobenzidine unit in the molecule, something which is increasingly being discussed as problematic from an environmental standpoint. The currently available yellow pigments that are free from chloro- and dichlorobenzidine, when employed in illustration intaglio printing inks, are found to have the following disadvantages: poor wettability and dispersibility with the customary synthetic or natural resins; poor rheological properties, i.e. the inks are not very mobile and are difficult to print with; and the coloristic properties, such as color strength, gloss and transparency, are inadequate.

Dilution with toluene to reduce the viscosity often fails since, as the toluene content increases, the inks flocculate and hence can no longer be used for printing.

The object was to provide yellow illustration intaglio printing inks which are free from amine-formulated P.Y. 12 pigments and preferably free from chloro- and dichlorobenzidine-containing pigments and which also overcome the disadvantages described above.

This object has surprisingly been achieved by a combination of C.I. Pigment Yellow 139 with one or more, preferably chlorine-free organic yellow pigments.

The present invention therefore provides an intaglio ink for printing illustrations, comprising C.I. Pigment Yellow 139 of the formula (I)

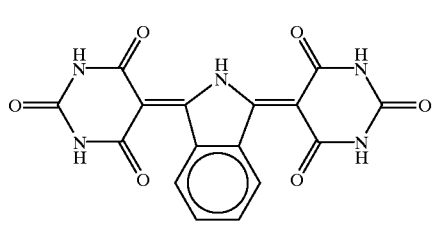

(I)

and one or more, for example 1, 2 or 3, preferably chlorine-free, organic yellow pigments.

C.I. Pigment Yellow 139 is known per se and is described, for example, in DE-A-3 022 839. The other, preferably chlorine-free organic yellow pigment employed in accordance with the invention can generally not be used alone for the intaglio printing of illustrations, since it has one or more of the disadvantages described above. C.I. Pigment Yellow 139 alone has the disadvantage of an excessively reddish shade. Surprisingly, however, P.Y. 139 has a stabilizing action in combination with other, preferably chlorine-free organic yellow pigments and improves the print performance properties. The toluene dilutability, which is important for the rheological properties, is markedly reduced and can be adjusted to a level conventional in the art.

Said preferably chlorine-free organic yellow pigments belong to the class of the monoazo, disazo and isoindoline pigments but are not restricted to this class. Particularly preferred pigments are those of the formula (II)

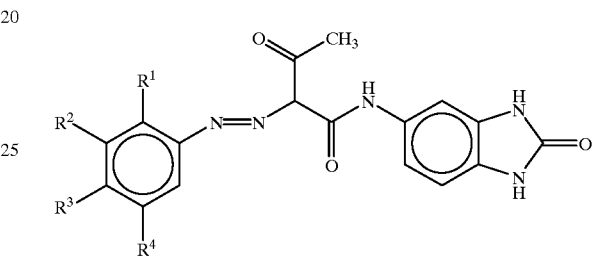

(II)

in which $R^1$ is hydrogen, $CF_3$, $OCH_3$, COOH or $COO(C_1–C_4)$alkyl;
$R^2$ is hydrogen or $COO(C_1–C_4)$alkyl;
$R^3$ is hydrogen or nitro and
$R^4$ is hydrogen or $COO(C_1–C_4)$alkyl,
or pigments of the formula (III)

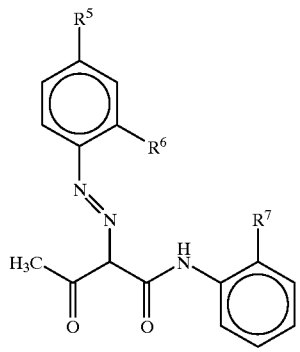

(III)

in which $R^5$ is hydrogen, methyl or nitro;
$R^6$ is nitro, methyl or methoxy; and
$R^7$ is hydrogen or methoxy.

Examples of the preferably chlorine-free organic yellow pigments for the purposes of the present invention are C.I. Pigment Yellow 1 (C.I. No. 11 680), C.I. Pigment Yellow 5 (C.I. No. 11 660), C.I. Pigment Yellow 74 (C.I. No. 11 741), C.I. Pigment Yellow 120 (C.I. No. 11 783), C.I. Pigment Yellow 151 (C.I. No. 13 980), C.I. Pigment Yellow 175 (C.I. 11 784) and C.I. Pigment Yellow 201 of the formula

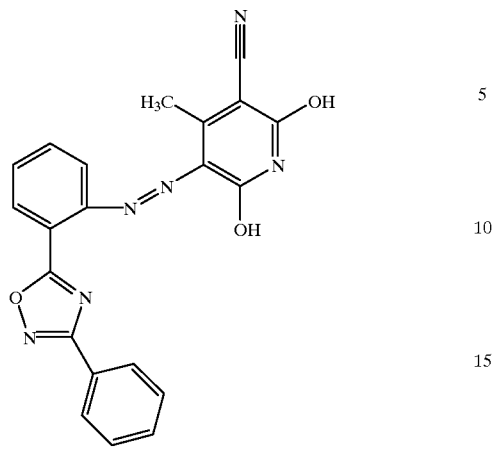
or another tautomer in respect of the pyridine ring,
C.I. Pigment Yellow 198 of the formula
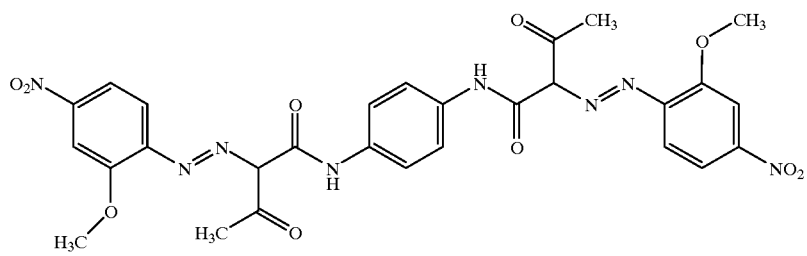
C.I. Pigment Yellow 194 of the formula
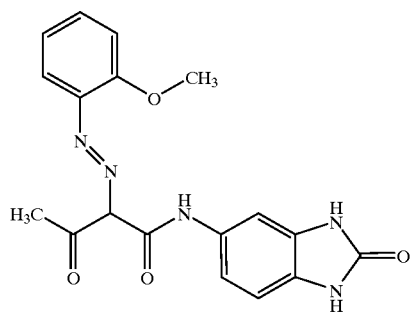
C.I. Pigment Yellow 185 of the formula
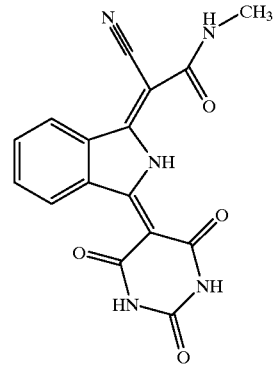

C.I. Pigment Yellow 181 of the formula

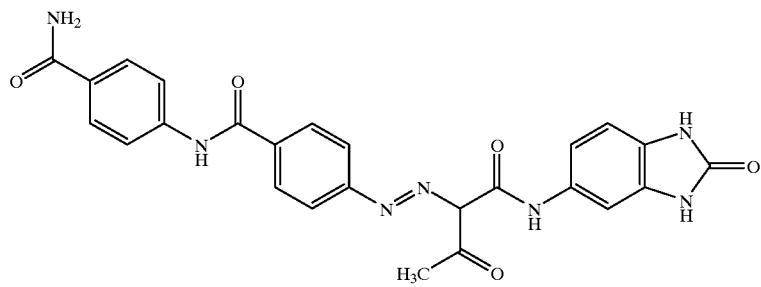

C.I. Pigment Yellow 180 of the formula

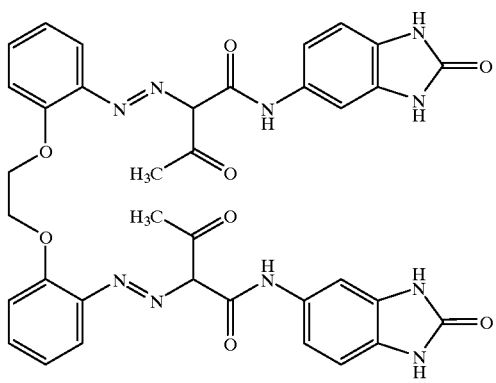

and the pigment of the formula (IV)

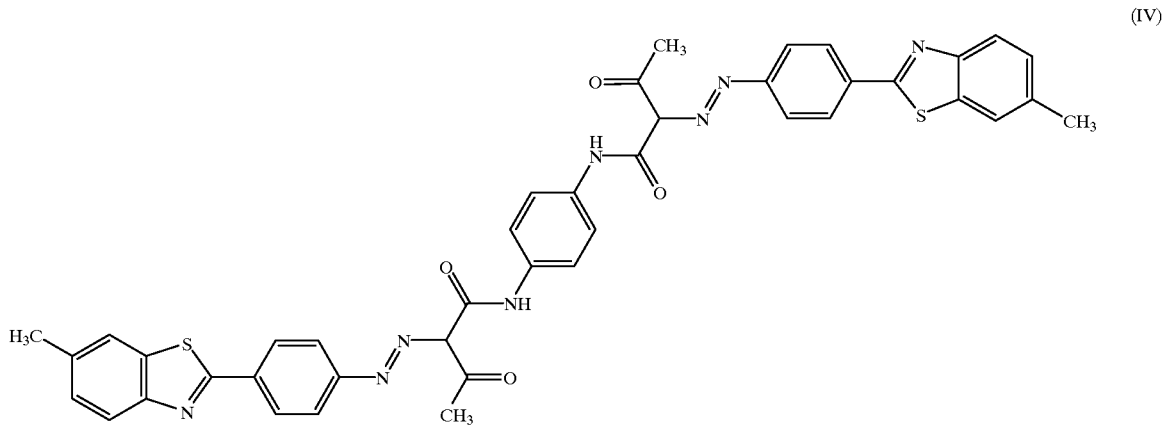

(IV)

The weight ratio between the pigment of the formula (I) and the further, preferably chlorine-free organic yellow pigment can vary within wide limits, for example between 10:90 and 90:10, preferably between 60:40 and 40:60.

An illustration intaglio printing ink of the invention (100% by weight) preferably has an overall pigment content of from 5 to 35% by weight, in particular from 5 to 20% by weight. The weight ratio of pigment to binder can be between 1:1 and 1:4, and that of pigment to solvent can be between 1:1 and 1:5. Customary additives and auxiliaries may make up from 0 to 5% by weight of the printing ink.

A suitable organic solvent is especially toluene, or mixtures of toluene and liquid hydrocarbons.

Appropriate binders are natural or synthetic resins, such as phenolic resin, customary commercial (including modified) rosins, such as disproportionated or hydrogenated rosin, customary commercial metal resinates (e.g. Ca, Mg, Zn) and hydrocarbon resins.

Further customary additives and auxiliaries can, for example, be waxes or azo dyes (yellow).

The illustration intaglio printing inks of the invention can be prepared by combining the abovementioned components in arbitrary sequence and dispersing the combination by appropriate means, for example by means of a dissolver, dispersing apparatus (paint shaker) or bead mill. Where pigments obtainable in granule form are to be used, they must be comminuted by appropriate means before or during the preparation of the printing ink. To prevent the settling of pigment particles it is judicious to meter the pigment, with stirring, into the initial charge of varnish/solvent mixture.

A ready-to-print illustration intaglio printing ink can be prepared by choosing the proportions of the components such that right from the start the desired flow time in a 3 mm flow cup (ISO 2431) is established at printing viscosity (from 25 s to 35 s), or by first of all preparing a printing ink concentrate (pigment content in most cases greater than or equal to 15% by weight) and appropriately diluting this concentrate with the organic solvent prior to printing.

The illustration intaglio printing inks of the invention are notable for particularly good rheological and coloristic properties, and for good storage and flocculation stability.

EXAMPLES

Preparing the printing ink concentrates:

Varnish, toluene and pigment are introduced in that order into a dispersing vessel and are stirred with a glass rod so as to give a homogeneous suspension with no agglomerates. 113 g of glass dispersing beads (diameter 1 mm) are added, the batch is stirred, and the dispersing vessel is sealed and briefly shaken by hand. The dispersing vessel and its contents are then shaken at about 20° C. for 20 minutes on a paint shaker machine. The dispersion concentrates are subsequently passed through a sieve to remove the glass beads.

Diluting the printing ink concentrates to the same viscosity:

Toluene is added to the resulting printing ink concentrates so as to establish a flow time of 30±0.2 s in a standardized flow cup (3 mm nozzle), ISO 2431.

Producing the prints:

The printing inks of identical flow time are printed using an intaglio print testing machine, model "Labratester", from Norbert Schäfli-Engler Maschinen, Zofingen, Switzerland, onto art paper APCO II/II, 150 g/m², from Scheufelen, Oberlenningen, Germany.

In the examples below the varnish used in each case is a modified Ca/Mg resinate. The varnish consists in each case of 60 parts by weight of this resin and 40 parts by weight of toluene.

The printing ink is prepared from the printing ink concentrates as described above.

Example 1 (Comparative Example)

77.5 g of varnish 50.0 g of toluene 22.5 g of C.I. Pigment Yellow 74 (C.I. No. 11 741)

150.0 g of printing ink concentrate (15% strength in terms of pigment)

The printing ink is highly flocculated, so that printing is impossible.

Example 2 (Comparative Example)

77.5 g of varnish 50.0 g of toluene 22.5 g of C.I. Pigment Yellow 139

150.0 g of printing ink concentrate (15% strength in terms of pigment)

The printing ink only has a low toluene dilutability of 8 g of toluene per 100 g of ink concentrate.

Example 3

77.5 g of varnish 50.0 g of toluene 22.5 g of pigment (90 parts by weight of C.I. Pigment Yellow 74+10 parts by weight of C.I. Pigment Yellow 139)

150.0 g of printing ink concentrate (15% strength in terms of pigment)

The printing ink, which was adjusted to a flow time of 30.0 s±0.2 s (3 mm flow cup), has not flocculated and has a toluene dilutability of 100 g of toluene per 100 g of ink concentrate.

Example 4

77.5 g of varnish 50.0 g of toluene 22.5 g of pigment (50 parts by weight of C.I. Pigment Yellow 74+50 parts by weight of C.I. Pigment Yellow 139)

150.0 g of printing ink concentrate (15% strength in terms of pigment)

The printing ink has not flocculated and, in comparison to the ink prepared in Example 3, has a lower toluene dilutability of 62 g of toluene per 100 g of ink concentrate. The printability is good.

Example 5 (Comparative Example)

77.5 g of varnish 50.0 g of toluene 22.5 g of pigment of the above formula (IV)

150.0 g of printing ink concentrate (15% pigment content)

The printing ink has flocculated, so that printing is impossible.

Example 6

77.5 g of varnish 50.0 g of toluene 22.5 g of pigment (90 parts by weight of pigment of the formula (IV)+10 parts by weight of C.I. Pigment Yellow 139)

150.0 g of printing ink concentrate (15% pigment content)

The printing ink has not flocculated and can be used for printing.

Example 7

77.5 g of varnish 50.0 g of toluene 22.5 g of pigment (50 parts by weight of pigment of the formula (IV) 50 parts by weight of C.I. Pigment Yellow 139)

150.0 g printing ink concentrate (15% pigment content)

The printing ink has not flocculated and has a toluene dilutability of 55 g of toluene/100 g of ink. The printability is good.

We claim:

1. An intaglio ink for printing illustrations, comprising C.I. Pigment Yellow 139 of the formula (I)

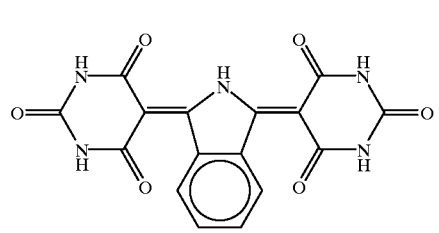

and one or more organic yellow pigments.

2. The ink as claimed in claim 1, wherein the organic yellow pigment or pigments is or are chlorine-free.

3. The ink as claimed in claim 1, wherein the organic yellow pigment is a monoazo, disazo or isoindoline pigment.

4. The ink as claimed in claim 1, wherein the organic yellow pigment is a pigment of the formula (II)

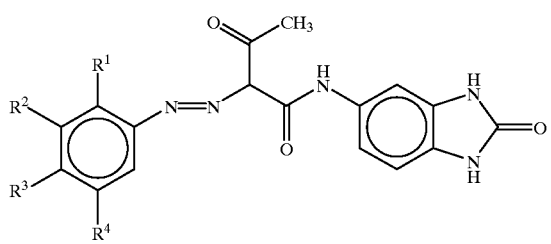

(II)

In which

R¹ is hydrogen, CF₃, OCH₃, COOH or COO(C₁–C₄)alkyl;

R² is hydrogen or COO(C₁–C₄)alkyl;

R³ is hydrogen or nitro and

R⁴ is hydrogen or COO(C₁–C₄)alkyl.

5. The ink as claimed in claim 1, wherein the organic yellow pigment is a pigment of the formula (III)

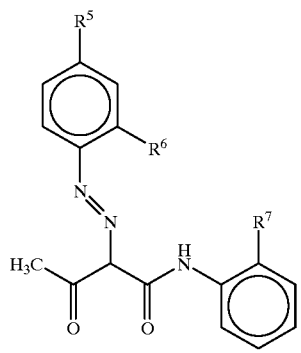

(III)

in which

R⁵ is hydrogen, methyl or nitro;

R⁶ is nitro, methyl or methoxy; and

R⁷ is hydrogen or methoxy.

6. The ink as claimed in claim 1, wherein the organic yellow pigment is C.I. Pigment Yellow 1 (C.I. No. 11 680), C.I. Pigment Yellow 5 (C.I. No. 11 660), C.I. Pigment Yellow 74 (C.I. No. 11 741), C.I. Pigment Yellow 120 (C.I. No. 11 783), C.I. Pigment Yellow 151 (C.I. No. 13 980), C.I. Pigment Yellow 175 (C.I. No. 11 784), C.I. Pigment Yellow 201 of formula

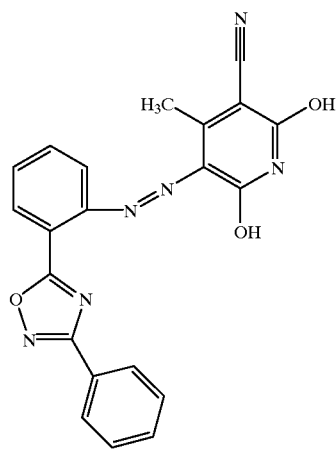

or another tautomer in respect of the pyridine ring,

C.I. Pigment Yellow 198 of the formula

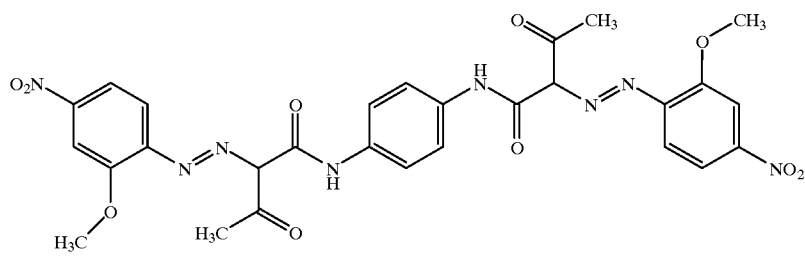

C. I. Pigment Yellow 194 of the formula
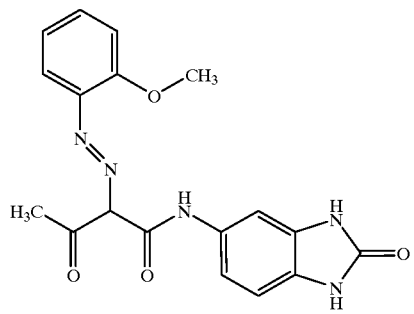
C.I. Pigment Yellow 185 of the formula
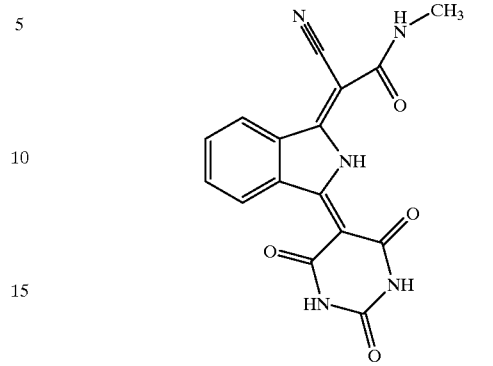
C.I. Pigment Yellow 181 of the formula
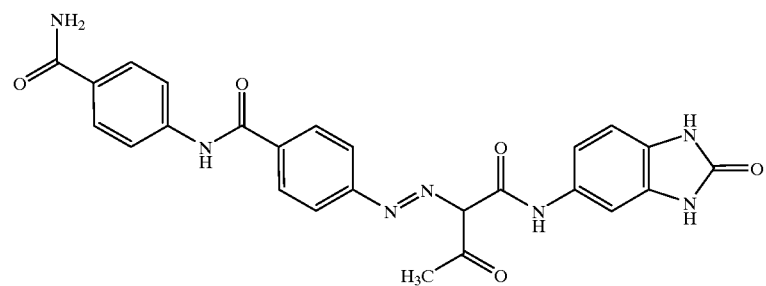
C.I. Pigment Yellow 180 of the formula
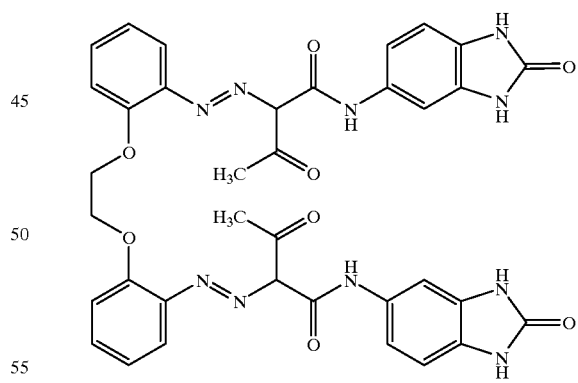

or the pigment of the formula (IV)

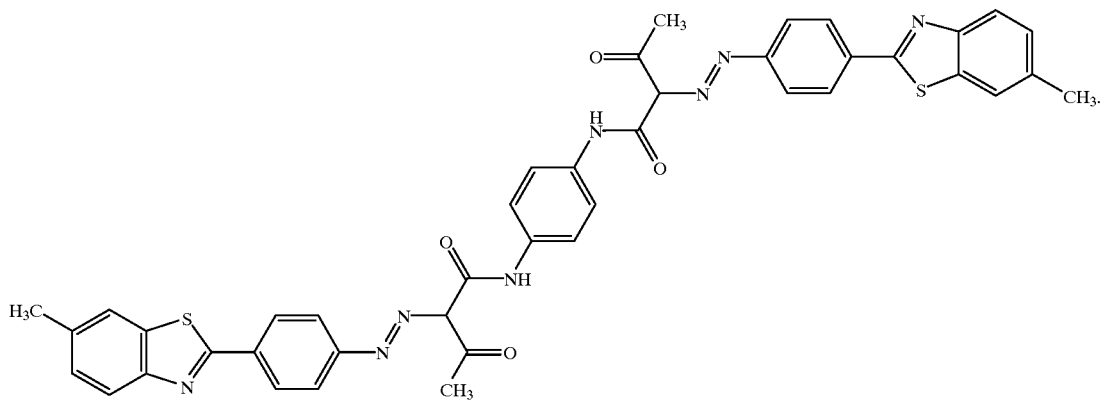

(IV)

7. The ink as claimed in claim 1, wherein the weight ratio between the pigment of the formula (I) and the organic yellow pigment is between 10:90 and 90:10.

8. The ink as claimed in claim 1, consisting essentially of from 5 to 35% by weight, of total pigment, a customary binder and an organic solvent.

9. The ink as claimed in claim 1, consisting essentially of from 5 to 20% by weight, of total pigment, a customary binder and an organic solvent.

10. The ink as claimed in claim 8, wherein the weight ratio of pigment to binder is between 1:1 and 1:4 and the weight ratio of pigment to solvent is between 1:1 and 1:5.

11. The ink as claimed in claim 8, wherein the organic solvent is toluene or a mixture of toluene and liquid hydrocarbons.

12. A process for preparing an ink as claimed in claim 1, which comprises combining the pigments, a printing ink varnish and the organic solvent, dispersing the combination and, optionally, diluting the resulting printing ink concentrate with further organic solvent to give a printable intaglio ink for the printing of illustrations.

* * * * *